(12) United States Patent
Hoinkhaus (10) Patent No.: US 9,108,481 B2
(45) Date of Patent: Aug. 18, 2015

(54) METHOD FOR PERFORMING A PLAUSIBILITY CHECK FOR DETECTING A LOSS OF LOAD BEARING CAPACITY IN A SUSPENSION SYSTEM OF A VEHICLE

(71) Applicant: Continental Teves AG & Co. oHG, Frankfurt (DE)

(72) Inventor: Hermann Hoinkhaus, Burgwedel (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/361,874

(22) PCT Filed: Nov. 8, 2012

(86) PCT No.: PCT/EP2012/072097
§ 371 (c)(1),
(2) Date: May 30, 2014

(87) PCT Pub. No.: WO2013/079292
PCT Pub. Date: Jun. 6, 2013

(65) Prior Publication Data
US 2014/0379210 A1    Dec. 25, 2014

(30) Foreign Application Priority Data
Dec. 1, 2011    (DE) .......................... 10 2011 087 550

(51) Int. Cl.
*B60G 17/0185*    (2006.01)
*B60G 17/015*    (2006.01)
*B60G 17/016*    (2006.01)
*B60G 17/052*    (2006.01)

(52) U.S. Cl.
CPC .......... *B60G 17/0185* (2013.01); *B60G 17/016* (2013.01); *B60G 17/0155* (2013.01);
(Continued)

(58) Field of Classification Search
CPC .......... G60G 17/0185; G60G 17/0521; G60G 17/016; G60G 2600/02; G60G 2400/0512; G60G 2400/0511; G60G 2600/12; G60G 2400/252; G60G 2600/08; G60G 2400/5122; G60G 5400/0513; G60G 2800/702; G60G 2400/61; G60G 2600/04; G60G 2800/80
USPC ............... 701/39, 37, 34.4; 280/6.157, 6.158, 280/6.151, DIG. 1, 6.153, 5.514; 180/41
See application file for complete search history.

(56) References Cited

U.S. PATENT DOCUMENTS 4,483,546 A    11/1984  Brearley
4,700,303 A    10/1987  Tokuyama et al.
(Continued)

FOREIGN PATENT DOCUMENTS

DE    102 58 265    8/2003
EP    0 114 757    8/1984
(Continued)

OTHER PUBLICATIONS

International Search Report corresponding to International application No. PCT/EP2012/072097, dated Apr. 24, 2013.
(Continued)

*Primary Examiner* — Marthe Marc-Coleman
(74) *Attorney, Agent, or Firm* — RatnerPrestia (57) ABSTRACT

A computer-implemented method for carrying out a plausibility check for recognizing a loss in load-bearing capacity in at least one suspension strut of a suspension system of a motor vehicle chassis during the operation of the chassis. Target-actual comparisons of measured suspension paths with evaluation parameters having predetermined critical threshold values calculated from the suspension paths are performed. In the event that the predetermined critical threshold values are exceeded or not attained, a recognition signal is set for a possible loss in load-bearing capacity.

9 Claims, 4 Drawing Sheets

(52) U.S. Cl.
CPC .... *B60G17/0521* (2013.01); *B60G 2400/0511* (2013.01); *B60G 2400/0512* (2013.01); *B60G 2400/0513* (2013.01); *B60G 2400/252* (2013.01); *B60G 2400/5122* (2013.01); *B60G 2400/61* (2013.01); *B60G 2600/02* (2013.01); *B60G 2600/04* (2013.01); *B60G 2600/08* (2013.01); *B60G 2600/12* (2013.01); *B60G 2800/702* (2013.01); *B60G 2800/80* (2013.01)

(56) References Cited

U.S. PATENT DOCUMENTS

| | | | | |
|---|---|---|---|---|
| 4,965,878 | A | * | 10/1990 | Yamagiwa et al. .............. 701/37 |
| 5,465,079 | A | * | 11/1995 | Bouchard et al. ............. 340/576 |
| 8,155,835 | B2 | * | 4/2012 | Holbrook ....................... 701/37 |
| 2003/0182990 | A1 | | 10/2003 | Stiller |

FOREIGN PATENT DOCUMENTS

| | | |
|---|---|---|
| EP | 1 190 926 | 3/2002 |
| EP | 1 342 596 | 9/2003 |
| WO | WO 2011/143377 | 11/2011 |

OTHER PUBLICATIONS

German Search Report corresponding to application No. DE 10 2011 087 550.6 dated Sep. 11, 2012.

* cited by examiner

METHOD FOR PERFORMING A PLAUSIBILITY CHECK FOR DETECTING A LOSS OF LOAD BEARING CAPACITY IN A SUSPENSION SYSTEM OF A VEHICLE

CROSS REFERENCE TO RELATED APPLICATIONS

This application is the U.S. National Phase Application of PCT/EP2012/072097, filed Nov. 8, 2012, which claims priority to German Patent Application No. 10 2011 087 550.6, filed Dec. 1, 2011, the contents of such applications being incorporated by reference herein.

FIELD OF THE INVENTION

The invention relates to a method for performing a plausibility check for detecting a loss of load bearing capacity in a suspension system of a vehicle.

BACKGROUND OF THE INVENTION

In the prior art there has been no known method so far for performing a plausibility check for detecting a loss of load bearing capacity in a suspension system of a vehicle.

SUMMARY OF THE INVENTION

An aspect of the invention provides a method for detecting a loss of load bearing capacity in a suspension system of a vehicle, a device for detecting a loss of load bearing capacity in a suspension system of a vehicle and a computer program product.

A method is provided for performing a plausibility check for detecting a loss of load bearing capacity in at least one suspension strut of a suspension system of a chassis during its operation, wherein target-actual comparisons are made between measured suspension displacements and evaluation variables calculated from the suspension displacements and predefined critical threshold values, wherein the evaluation variables calculated from the suspension displacements include:
  a sum of the suspension displacements,
  an average value of the suspension displacements,
  a roll angle of a front axle of the chassis,
  a roll angle of a rear axle of the chassis,
  an average value of said roll angle,
  a pitch angle on the right side of the chassis,
  a pitch angle on the left side of the chassis,
  an average value of said pitch angle,
  an angle of rotation of the chassis about a diagonal axis formed by a left front wheel and a right rear wheel of the chassis,
  an angle of rotation of the chassis about a diagonal axis formed by a right front wheel and a left rear wheel of the chassis, or
  an average value of the angle of rotation about the diagonal axes,
and wherein in the case in which the predefined critical threshold values are exceeded or not attained a detection signal is set for the possible existence of a loss of load bearing capacity.

Embodiments of the invention can have the advantage that a measurement of the load bearing capacity of the suspension system of a vehicle is only carried out if a plausibility check based on observations of vehicle states provides an indication that there could be a loss of load bearing capacity of the suspension system. By contrast, if the plausibility check gives a quantitative result indicating that a loss of the load bearing capacity of the suspension system could not exist under any circumstances, initiation of a measurement of the load bearing capacity need not even be carried out.

The embodiment of the invention thus advantageously provides a method for indicating a loss of load bearing capacity of the suspension system of a vehicle without the use of additional measurement instruments that is independent of the measurement method of the load bearing capacity measurement. If the sensors for measurement of the loss of load bearing capacity should fail, then the invention provides another independent method for detecting a loss of load bearing capacity that is a risk to safety. Driving safety is thereby enhanced.

Because greater safety for the driver during travel is thus guaranteed, e.g. in the case of an air suspension system a residual pressure retaining valve would no longer be necessary.

The purpose of such residual pressure retaining valves is that rolling of the air suspension without pressure is always excluded. In particular, in the event of a long stationary period rolling of the preassembled air suspension on the rolling piston without pressure should be prevented.

According to one embodiment of the invention, the suspension displacements, which are used for calculating the calculated evaluation variables, are bandpass filtered and offset-free. In this context freedom from offset means phase equality of the measured height signals for determining the suspension displacements of different suspension struts relative to time.

This can have the advantage that the actual suspension displacements of the suspension struts are measured, because disruptive influences during measurement are eliminated. A suitable bandpass filtering of a received signal for suspension displacement measurement can suppress disturbance noise. A distortion-free measurement of an individual suspension displacement would thus be possible.

Freedom from offset guarantees that the measurement values for the suspension displacements of different suspension struts are placed in a temporally correct relationship. The time displacement of the suspension displacements measured on different suspension struts would thus be zero. Thus a prerequisite would be fulfilled in order for the values for the measured suspension displacements to be placed in a relationship with each other or to be combined with each other by means of a mathematical operation in order to generate further evaluation variables for evaluation.

According to one embodiment of the invention, identification of a loss of load bearing capacity is carried out in a suspension strut of a wheel of the chassis and/or in the suspension system of an axle of the chassis.

This can have the advantage that both an identification of a possible loss of load bearing capacity both on a single wheel of the vehicle and also on an axle is possible. This enables suitable targeted further measurements and/or countermeasures to be introduced in the event of a loss of load bearing capacity. The driver could also obtain information for the location of a possible loss of load bearing capacity and could initiate countermeasures accordingly.

According to one embodiment of the invention, the target-actual value comparisons of the respective measured suspension displacements and the evaluation variables calculated therefrom with the respective defined threshold variables are repeated at definable time intervals.

Repeated performance of a plausibility check with comparison of the measured values of the suspension displacements with defined critical threshold variables at a definable time interval increases driving safety. This is because a deviation of the measured values from the target values can be determined promptly. Triggering of the actual measurement of the loss of load bearing capacity could be initiated promptly if necessary. Suitable countermeasures could be initiated promptly.

According to one embodiment of the invention, the identification signal for the loss of load bearing capacity is only set following repeated verification.

This can have the advantage that a warning is not given immediately every single time a target value is first exceeded, but only following a repeated process of verification that a target value has actually been exceeded, having been triggered by a loss of load bearing capacity. False alarms are thereby reduced.

According to one embodiment of the invention, the identification signal for the loss of load bearing capacity is set in a controller of a chassis.

This can have the advantage that the identification signal set in the controller could be used for other controls. Thus not only could a measurement of the loss of load bearing capacity be triggered on a certain suspension strut of the suspension system, but local control countermeasures could certainly also be automatically initiated because all vehicle information and control options would be readily accessible to the central control unit at any time and could be used.

According to one embodiment of the invention, in the case in which the target-actual value comparisons indicate a loss of load bearing capacity, a trigger signal is set for the actual measurement of the load bearing capacity in the at least one identified suspension strut of the suspension system of the chassis.

This can have the advantage that the evidence provided by the plausibility check regarding the observation of vehicle states could be verified and/or invalidated by a direct measurement of the loss of load bearing capacity with suitable measurement instruments. A verification of a loss of load bearing capacity in the suspension strut system has proved especially advantageous prior to the initiation of control countermeasures. This could prevent any false countermeasures from being initiated.

In another aspect the invention relates to a computer program product with instructions for performing the method described above that can be executed by a processor.

In another aspect the invention relates to a checking device for performing a plausibility check for detecting a loss of load bearing capacity in at least one suspension strut of a suspension system of a chassis during its operation, which is designed to carry out target-actual value comparisons between measured suspension displacements and evaluation variables calculated from the suspension displacements with predefined critical threshold variables, wherein the evaluation variables calculated from the suspension displacements include:
a sum of the suspension displacements,
an average value of the suspension displacements,
a roll angle of a front axle of the chassis,
a roll angle of a rear axle of the chassis,
an average value of said roll angle,
a pitch angle on the right side of the chassis,
a pitch angle on the left side of the chassis,
an average value of said pitch angles,
an angle of rotation of the chassis about a diagonal axis formed by a left front wheel and a right rear wheel of the chassis,
an angle of rotation of the car plant about a diagonal axis formed by a right front wheel and a left rear wheel of the chassis, or
an average value of the angle of rotation about the diagonal axes, and wherein in the case in which the predefined critical threshold values are exceeded or not attained, an identification signal is set for the possible existence of a loss of load bearing capacity.

BRIEF DESCRIPTION OF THE DRAWINGS

Preferred embodiments of the invention are explained in detail below using the following figures.

In the figures.

DETAILED DESCRIPTION OF THE PREFERRED EMBODIMENTS

Any loss of load bearing capacity in suspension struts of a suspension system of a chassis leads to characteristic signal profiles in relation to the suspension displacements, roll angle and pitch angle and/or their cumulative values. Load bearing capacity in this context is to be understood e.g. as a loss of compressed air in an air suspension system or a malfunction of a steel suspension system or of a hydropneumatic level control system.

Observations on the vehicle in the event of a loss of load bearing capacity of a suspension system have shown that e.g. small, large or extreme deviations from predefined target values for suspension displacements, roll angle and/or pitch angle or their average values and/or summation values can occur in an air suspension system depending on the nature of the loss of air. Accordingly, an indication of the nature of a loss of load bearing capacity can be given by any detection of a small or large target deviation. Hence different permitted interval limits can be predefined, e.g. for small target deviations and for large target deviations, wherein a conclusion can be drawn regarding the nature of the loss of load bearing capacity in the event of the respective limit being exceeded.

For a plausibility check based on the observation of the vehicle behavior for pre-detection of whether there could possibly be a loss of load bearing capacity on at least one of the suspension struts of a suspension system of a chassis, in embodiments of the invention, besides measured height values for spring displacements of the suspension struts, other evaluation variables are calculated from the spring displacements in a signal conditioning phase for a resulting identification signal as an indication of a possible loss of load bearing capacity.

In this context the suspension displacement is understood to be the displacement of a wheel between the unloaded position (zero wheel load) and the loaded position (generally twice the static wheel load).

A larger suspension displacement enables the compensation of large road unevenness, but causes a higher center of gravity of the vehicle and therefore opposes high speeds in corners for two-track vehicles. Sports vehicles therefore generally have a small suspension displacement. The shorter the suspension displacement, the stiffer the springs must be. This applies to conventional linear steel springs, whose force increases with the reduction of the displacement, and to steel torsion bar springs, whose torque increases with the angle of twist, but it does not apply in any case to air, gas, hydraulic or combination systems. The suspension displacement can be reduced by suspension displacement limiters.

Figure 4:
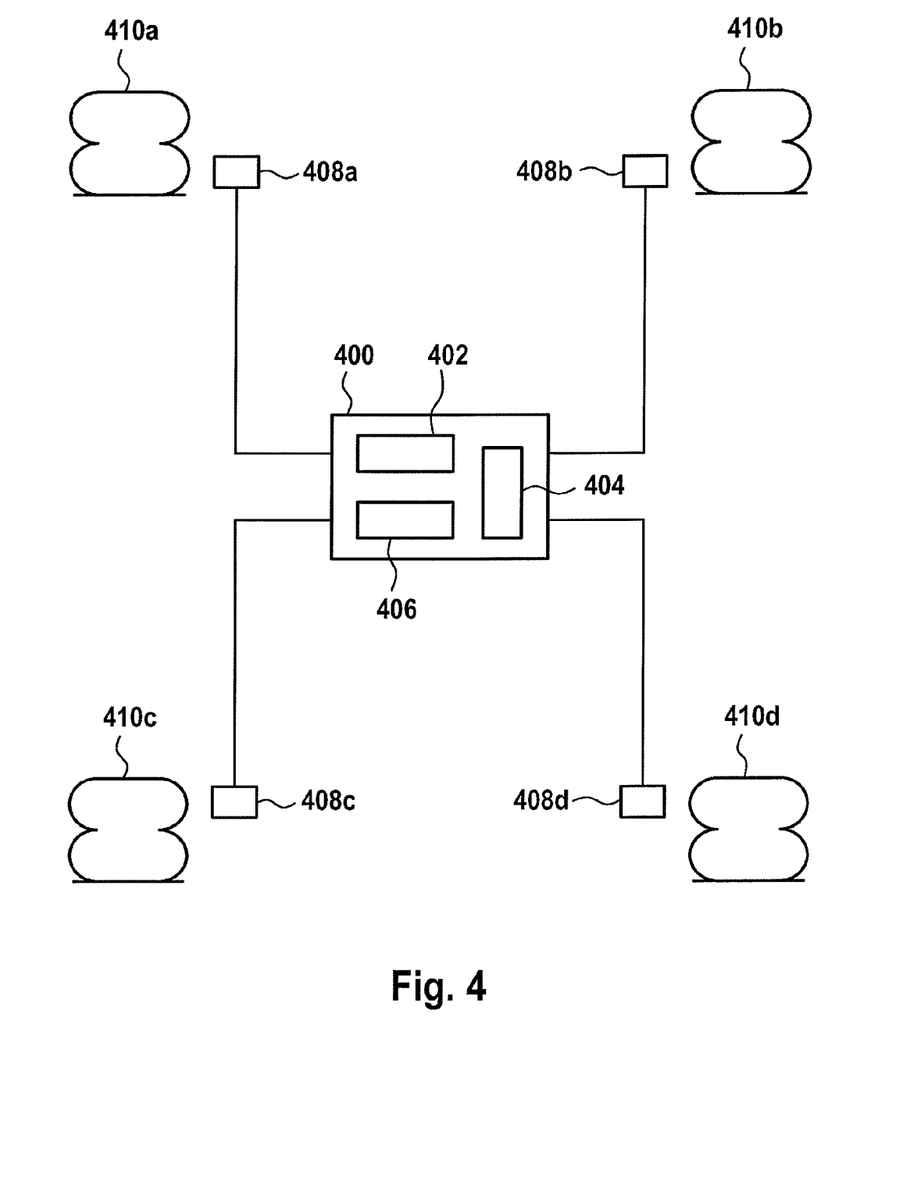
FIG. 4 shows a checking device and a means for the measurement of suspension displacements in suspension struts.

FIG. 4 shows a checking device 400 of a vehicle with a processor 402, a memory 404 and a module 406, which receives information about the suspension displacements of the suspension struts 410a, 410b, 410c, 410d via means for the measurement of suspension displacements 408a, 408b, 408c, 408d. For example, the steps of the described method could run in the module 406.

Embodiments of the invention could be usable for vehicles with a steel spring suspension without level adjustment. Here a possible asymmetrical loading of the vehicle, which could lead to poor controllability of the vehicle and/or to a risk to driving safety during travel, could be detected. For example, a breakage of a chassis element, such as e.g. a suspension spring, could be detected for a steel spring suspension without level adjustment.

The invention can also be used for a vehicle with a steel spring suspension with level adjustment with e.g. a base point displacement and/or a self-pumping hydropneumatic system. A functional test of the level adjustment would be possible here.

The invention could also be used in a vehicle with a hydropneumaticsuspension. A loss of function of the suspension could be detected here. Depending on the implementation of the system, in the case of a positive plausibility check a subsequent measurement of the load bearing capacity could be triggered.

Figure 1:
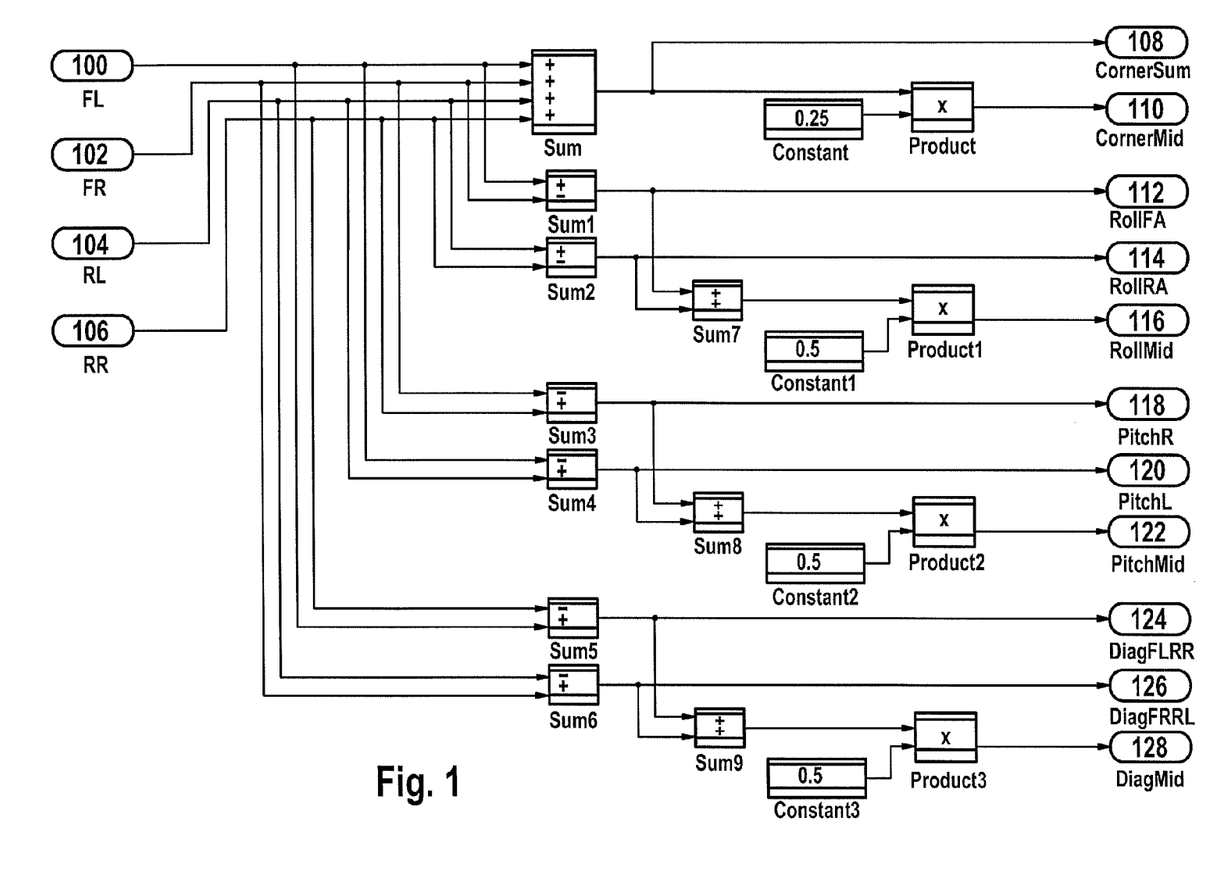
FIG. 1 shows a flow chart with steps of the method for deriving evaluation variables from measured suspension displacements.

FIG. 1 shows how other evaluation variables (sum of suspension displacements 108, average value of suspension displacements 110, roll angle VA 112, roll angle HA 114, average value of roll angle 116, right pitch angle 118, left pitch angle 120, average value of pitch angle 122, diagonal VL-HR 124, diagonal VR-HL 126, average value of diagonals 128) for assessment of whether there could be a loss of load bearing capacity, could be determined from measured suspension displacements VL (left front wheel) 100, VR (right front wheel) 102, HL (left rear wheel) 104 and HR (right rear wheel) 106 by mathematical operations (Sum, Sum1, Sum2, Sum3, Sum4, Sum5, Sum6, Sum7, Sum8, Sum9, Constant, Constant1, Constant2, Constant3, Product, Product1, Product2, Product3). In this case VA stands for front axle and HA stands for rear axle.

The roll angle is a parameter for the roll movement of a vehicle. It defines the angle of rotation about the longitudinal axis of the vehicle. The pitch angle is a parameter of the pitching movement of a vehicle. The pitching movement of a vehicle corresponds to the longitudinal inclination of a vehicle, i.e. of the movement about its lateral axis (nose up or down). The pitch angle describes the angle of the nose of the vehicle above or below the horizon.

The measurement of the suspension displacements 100, 102, 104, 106 of the suspension struts of a suspension system of a vehicle takes place initially by receiving a height signal by means of height sensors in the suspension system of the chassis. In order to relate only the in-phase suspension displacements, the offsets of the received signals are taken into account. In order to suppress disturbance noise from differently produced signals, bandpass filtering of the received height signals is also carried out. Only thereafter will signal conditioning take place, as illustrated in FIG. 1, during which bandpass filtered offset-free suspension displacements VL 100, VR 102, HL 104, HR 106 are used as input variables for calculating further evaluation variables 108, 110, 112, 114, 116, 118, 120, 122, 124, 126, 128 as output variables.

In FIG. 1 e.g. the sum of the suspension displacements CornerSum 108 is calculated by simple addition of the bandpass filtered offset-free suspension displacements by means of the mathematical operation Sum. The average value of the suspension displacements CornerMid 110 is calculated by a series connection of the mathematical summation operation Sum and a multiplication operation Product with the constant Constant with value 0.25. The roll angle of the front axle RollFA 112 is calculated from the summation Sum1 of the suspension displacements FL 100 and FR 102. The roll angle of the rear axle RollRA 114 is calculated from the summation Sum2 of the suspension displacements RL 104 and RR 106. The average value of the roll angle RollMid 116 is calculated from a summation Sum7 of the calculated roll angles RollFA 112 and RollRA 114 and a multiplication Product 1 with a constant Constant1 with value 0.5. The right pitch angle PitchR 118 is calculated from the summation Sum3 of the suspension displacements FR 102 and RR 106. The left pitch angle PitchL 120 is calculated from the summation Sum4 of the suspension displacements FL 100 and RL 104. The average value of the pitch angles PitchMid 122 is calculated from the summation Sum8 of the right pitch angle PitchR and of the left pitch angle PitchL 120 and subsequent multiplication Product2 with the constant Constant2 with a value of 0.5. A torsion about the diagonal axis left front wheel/right rear wheel DiagFLRR 124 is calculated from a summation Sum5 of the suspension displacements FL 100 and RR 106. A torsion about the diagonal axis right front wheel/left rear wheel DiagFLRL 126 is calculated from a summation Sum6 of the suspension displacements FR 102 and RL 106. An average value DiagMid 128 of the torsions about the two diagonal axes is calculated from a summation Sum9 and subsequent multiplication Product3 with the constant Constant3 with value 0.5. The calculation modes mentioned are only examples of possible embodiments of the invention.

Figure 2:
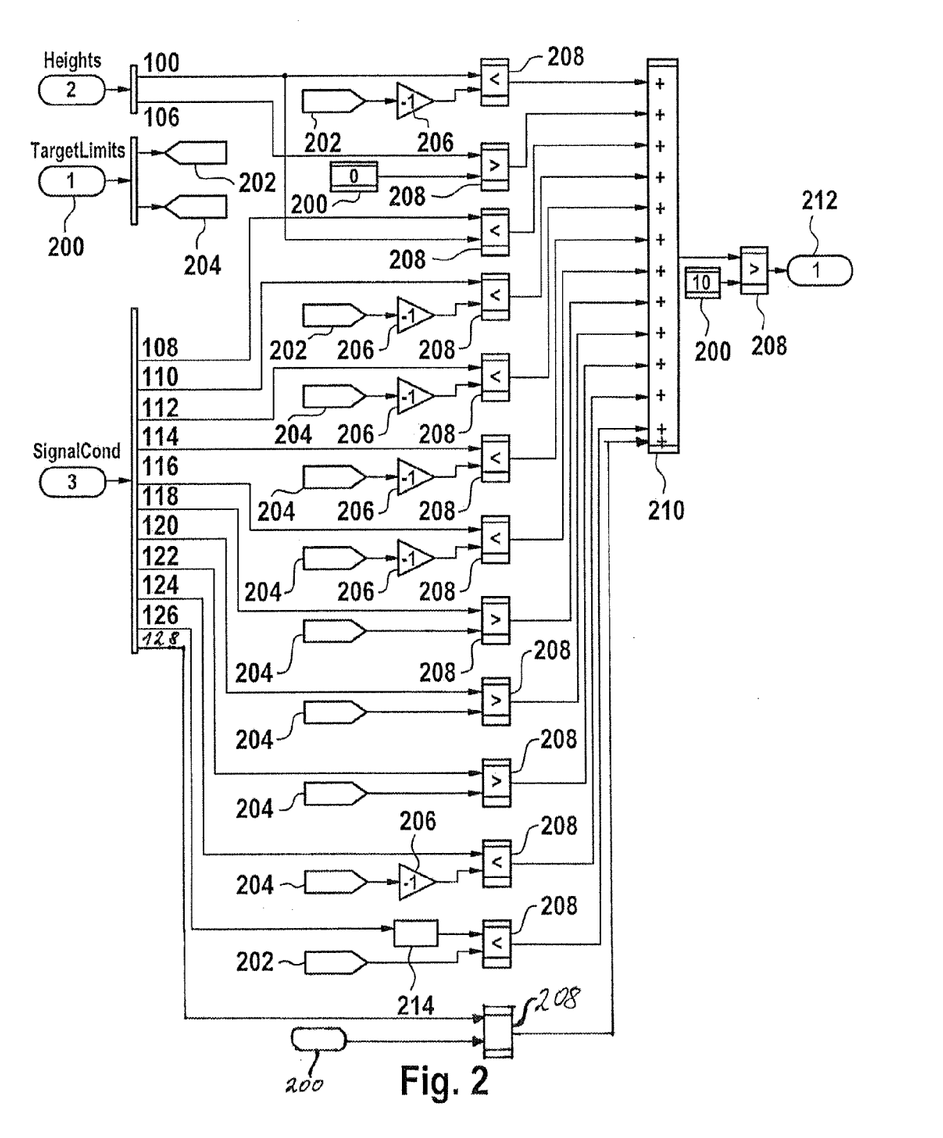
FIG. 2 shows a flow chart with steps of a method for generating a detection signal for the possible existence of a loss of load bearing capacity for a suspension strut on a corner of a vehicle.

FIG. 2 shows how measured suspension displacements Heights and other evaluation variables SignalCond 108, 110, 112, 114, 116, 118, 120, 122, 124, 126, 128 calculated from these are each systematically individually subjected to a target-actual value comparison with respective predefined threshold variables TargetLimits 200, such as e.g. a predefined target level TargetLevel 200, including taking into account a small deviation Limit_Near 202 and/or a large deviation limit Limit_Wide 204. The respective deviations of the measured and calculated vehicle variables are quantified by means of a ratio RelationalOperatorX 208 (X stands for an index number). Said ratios RelationalOperatorX 208 are summed in the operation Sum11 210. The sum of said ratios RelationalOperatorX 208 is compared with a predefined total ratio, in this case RelationalOperator12 208, which represents a constant C. The setting of a detection signal 212 takes place depending on the ratio of the sum of the ratios RelationalOperatorX 208 to the predefined total ratio C and on which target value is met. The value for the total ratio is thereby based on a multi-stage mathematical combination or aggregation of empirically observed suitable vehicle variables, whose values correlate with high validity and high reliability with a loss of load bearing capacity in a suspension strut on a vehicle wheel.

In FIG. 2 the setting of a detection signal 212 is carried out, which e.g. indicates a potential loss of load bearing capacity on the left front wheel. The method thus enables the detection of a possible loss of load bearing capacity on a single defined wheel of the vehicle. An identification signal 212 that is set after passing through all steps of the method conveys information about on exactly which vehicle wheel there is a loss of load bearing capacity.

In the case in which a possible loss of load bearing capacity is to be indicated for exclusively a single wheel, the setting of a detection signal 212 only takes place if there are a predefined number of target-actual value deviations for the evaluation variables 108, 110, 112, 114, 116, 118, 120, 122, 124, 126, 128. With the embodiments illustrated in FIG. 2, e.g. 11 of 13 evaluation variables would have to have deviations of their actual values from the target values 200 in order for an identification signal 212 to be set. The described steps of the method include as valid and reliable target-actual value deviations of the evaluation variables 108, 110, 112, 114, 116, 118, 120, 122, 124, 126, 128 for detecting a possible loss of load bearing capacity on only one wheel e.g.:

suspension displacement on the left front wheel (corner FL)<−large deviation (−limit_wide);
suspension displacement on the right rear wheel (corner RR) (diagonally opposite)<0;
sum of all suspension displacements (corner sum) (all corners)<−small deviation (−limit_near);
roll angle front axle (roll value FA)<−large deviation (−limit_wide);
roll angle rear axle (roll value RA)<−large deviation (−limit_wide);
average value of the roll angles (roll value mean value)<−large deviation (−limit_wide);
right pitch angle (pitch value R)<+large deviation (+limit_wide);
left pitch angle (pitch value L)<+large deviation (+limit_wide);
average value of the pitch angles (pitch value mean value) <large deviation (limit_wide);
torsion about the diagonal axis left front wheel/right rear wheel (diagonal value FLRR)<−large deviation (−limit_wide);
torsion about the diagonal axis right front wheel/left rear wheel (diagonal value FRRL)<small deviation (limit_near).

The target-actual value deviations listed above are only exemplary for embodiments of the invention.

Figure 3:
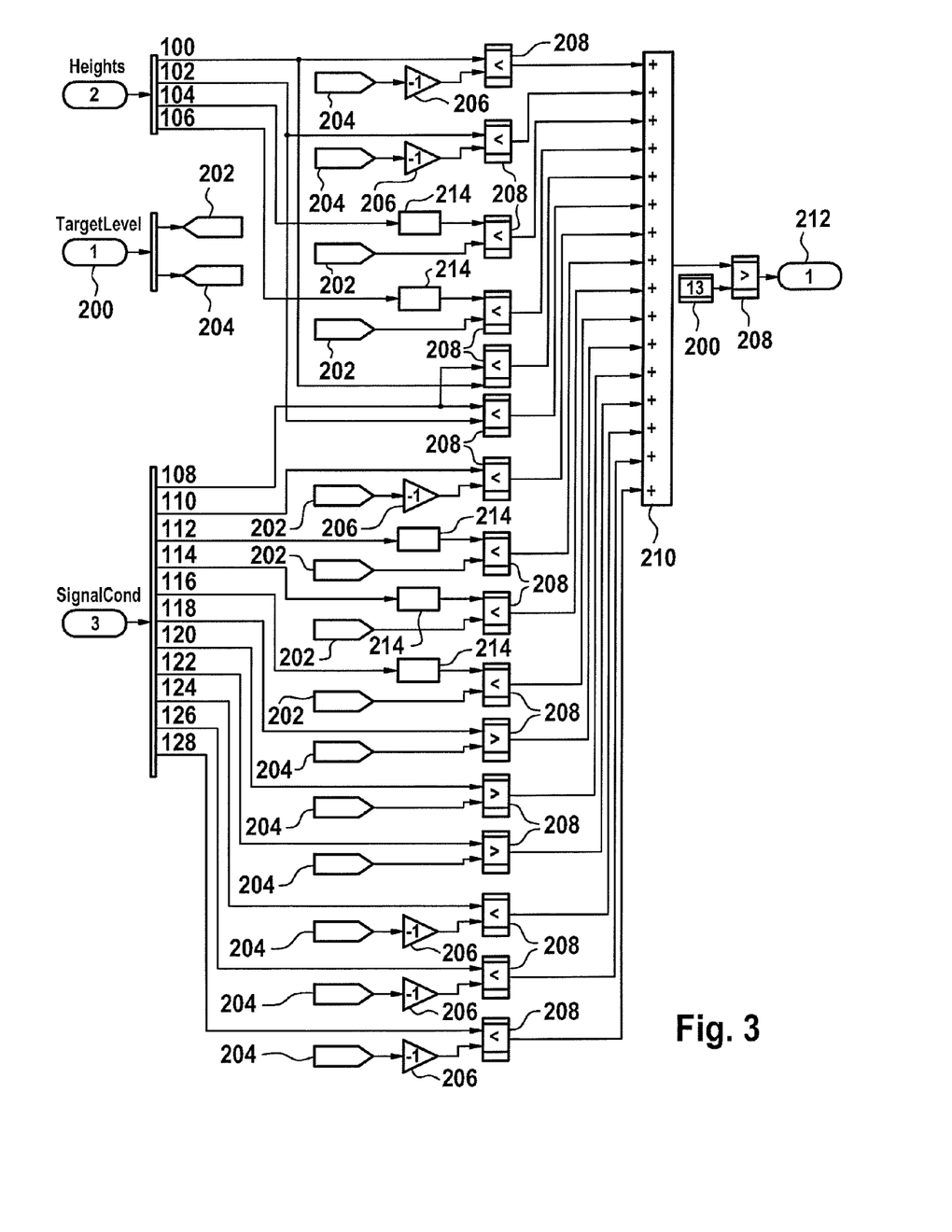
FIG. 3 shows a flow chart with steps of a method for generating a detection signal for the possible existence of a loss of load bearing capacity on an axle of a vehicle.

How recognizing the potential presence of a loss of load bearing capacity on a vehicle axle is possible is illustrated in FIG. 3 by way of example. Here too suspension displacements Heights are measured and other evaluation variables SignalCond 108, 110, 112, 114, 116, 118, 120, 122, 124, 126, 128 derived from these are each systematically individually subjected to a target-actual value comparison with respective predefined threshold variables TargetLimits 200, such as e.g. a predefined target level TargetLevel 200 including taking into account a small deviation Limit_Near 202 and/or a large deviation Limit_Wide 204.

The respective deviations of the measured and calculated vehicle variables are also quantified by means of a ratio RelationalOperatorX 208 (X stands for an index number). Said ratios RelationalOperatorX are in turn summed in the operation Sum11 210. The sum of said ratios RelationalOperatorX 208 is similarly compared with a predefined total ratio 208, in this case RelationalOperator12, which represents a constant C. The setting of a detection signal also takes place depending on the ratio of the sum of the ratio RelationalOperatorX to the predefined total ratio C and on which target value is met. The value for the total ratio is based here on a multi-stage mathematical combination or aggregation of empirically observed suitable vehicle variables, whose values correlate with high validity and high reliability with a loss of load bearing capacity in a suspension strut on a vehicle axle.

In FIG. 3 the setting of a detection signal 212 that indicates a potential loss of load bearing capacity on the front axle of the chassis is carried out. The method thus enables the detection of a possible loss of load bearing capacity on an axle of a vehicle. An identification signal that is set after running through all steps of the method conveys information about on exactly which vehicle axle there is a loss of load bearing capacity.

In the case in which a possible loss of load bearing capacity for exclusively one vehicle axle is to be indicated, the setting of a detection signal 212 only takes place if there are a predefined number of target-actual value deviations for the evaluation variables 108, 110, 112, 114, 116, 118, 120, 122, 124, 126, 128. For the embodiment illustrated in FIG. 3, e.g. 14 of 16 evaluation variables would have to have deviations of their actual values from the target values 200 in order that an identification signal 212 would be set. The described steps of the method include as valid and reliable target-actual value deviations of the evaluation variables 108, 110, 112, 114, 116, 118, 120, 122, 124, 126, 128 for detecting a possible loss of load bearing capacity on a vehicle axle e.g.:

suspension displacement on the left front wheel (corner FL)<−large deviation
(−limit_wide); suspension displacement on the right front wheel (corner FR)<−large deviation (−limit_wide);
suspension displacement on the left rear wheel (corner RL)<small deviation
(−limit_near);
suspension displacement on the right rear wheel (corner RR)<small deviation
(−limit_near);
sum of all suspension displacements (corner_sum) (all corners)<spring displacement on the left front wheel (corner FL);
sum of all suspension displacements (corner sum) (all corners)<spring displacement on the right front wheel (corner FR);
average value of the suspension displacements (corner mean value)<−small deviation (−limit_near);
front axle roll angle (roll value FA)<small deviation (−limit_near);
rear axle roll angle (roll value RA)<small deviation (−limit_near);
average value of the roll angles (mean value of roll values) <−small deviation
(−limit_near);
right pitch angle (pitch value R)>large deviation (limit_wide);
left pitch angle (pitch value L)>large deviation (limit_wide);
average value of the pitch angle (mean value of pitch values)>large deviation (limit_wide);
torsion about the diagonal axis left front wheel/right rear wheel (diagonal value FLRR)<−large deviation (−limit_wide);
torsion about the right front wheel/left rear wheel diagonal axis (diagonal value FRRL)<−large deviation (−limit_wide);
average value of the torsions about the diagonal axes<−large deviation (−limit_wide)

The target-actual value deviations listed above are again only exemplary for embodiments of the invention.

The steps of the method illustrated in FIGS. 1, 2 and 3 are repeated regularly.

The setting of a detection signal 212 based on the target-actual value comparisons is not carried out immediately on first exceeding or not attaining a critical threshold value 200, but only after confirmation of the detection signal 212 following the uninterrupted presence for a freely configurable period of time. Dynamic driving behavior is thus taken into account and false alarms are reduced.

According to embodiments of the invention, the identification signal 212 is configured as a trigger signal for initiating a direct measurement of a loss of load bearing capacity by suitable measurement instruments. With an air suspension system, e.g. pressure sensors could be caused, e.g. by the trigger signal, to directly measure compressed air in the suspension struts of the air suspension system.

The functions of embodiments of the invention could be implemented in control units of a vehicle. Thus e.g. the computation cycle of the steps of the method could be integrated within the computation cycle of a controller and synchronized with the same.

Embodiments as a computer program product are also possible, so that the method could be used irrespective of the respective type of vehicle.

REFERENCE CHARACTER LIST 100 suspension displacement on the left front wheel
102 suspension displacement on the right front wheel
104 suspension displacement on the left rear wheel
106 suspension displacement on the right rear wheel
108 sum of the suspension displacements
110 average value of suspension displacements
112 roll angle of the front axle
114 roll angle of the rear axle
116 average value of the roll angles
118 right pitch angle
120 left pitch angle
122 average value of the pitch angles
124 diagonal axis formed by the left front wheel and the right rear wheel
126 diagonal axis formed by the right front wheel and the left rear wheel
128 average value of the diagonals
200 respective target value
202 small deviation from the respective target value
204 large deviation from the respective target value
206 tolerance limit
208 ratio of target value and actual value
210 aggregation
212 identification signal
214 absolute value of the tolerance limit
400 checking device
402 processor
404 memory
406 module
408a, 408b, 408c, 408d means for the measurement of suspension displacements of suspension struts
410a, 410b, 410c, 410d suspension struts

The invention claimed is:

1. A computer-implemented method for performing a plausibility check for detecting a loss of load bearing capacity in at least one suspension strut of a suspension system of a vehicle chassis during vehicle operation, the method comprising:
computing, by a processor located in a control unit of the vehicle, evaluation variables calculated from suspension displacements of the at least one suspension strut, the evaluation variables calculated from the suspension displacements include at least one of:
a sum of the suspension displacements,
an average value of the suspension displacements,
a roll angle of a front axle of the chassis,
a roll angle of a rear axle of the chassis,
an average value of said roll angles,
a pitch angle on a right side of the chassis,
a pitch angle on a left side of the chassis,
an average value of said pitch angles,
an angle of rotation of the chassis about a diagonal axis formed by a left front wheel and a right rear wheel of the chassis,
an angle of rotation of the chassis about a diagonal axis formed by a right front wheel and a left rear wheel of the chassis,
or an average value of the angle of rotation about the diagonal axes,
computing, by the processor located in the control unit of the vehicle, target-actual value comparisons by comparing predefined critical threshold values to the evaluation variables and to the suspension displacements, and
setting, by the processor located in the control unit of the vehicle, an identification signal when the predefined critical threshold values are exceeded or not attained to indicate the existence of a loss of load bearing capacity on the suspension strut of at least one of the wheels of the vehicle.

2. The method as claimed in claim 1, wherein the suspension displacements that are used for calculating the evaluation variables are bandpass filtered and offset-free.

3. The method as claimed in claim 1, wherein the identification of a loss of load bearing capacity in a suspension strut of a wheel of the chassis and/or in the suspension system of an axle of the chassis is carried out.

4. The method as claimed in claim 1, wherein the target-actual value comparisons of the respective measured suspension displacements and the evaluation variables calculated therefrom with the respective defined threshold variables are repeated at definable time intervals.

5. The method as claimed in claim 1, wherein the identification signal for the loss of load bearing capacity is only set following repeated verification.

6. The method as claimed in claim 1, wherein the identification signal for the loss of load bearing capacity is set in a controller of a chassis.

7. The method as claimed in claim 1, wherein in the case in which the target-actual value comparisons indicate a loss of load bearing capacity, a trigger signal is set for the actual measurement of the load bearing capacity in the at least one identified suspension strut of the suspension system of the chassis.

8. A computer program product stored in a non-transitory computer readable medium with instructions that can be implemented by a processor for performing the steps of the method as claimed in claim 1.

9. A checking device for performing a plausibility check for detecting a loss of load bearing capacity in at least one suspension strut of a suspension system of a vehicle chassis during vehicle operation, including:
a processor located in a control unit of the vehicle and configured to:
carry out target-actual value comparisons between measured suspension displacements and evaluation variables calculated from the suspension displacements with predefined critical threshold variables, wherein the evaluation variables calculated by the suspension displacements include at least one of:

a sum of the suspension displacements,
an average value of the suspension displacements,
a roll angle of a front axle of the chassis,
a roll angle of a rear axle of the chassis,
an average value of said roll angles,
a pitch angle on a right side of the chassis,
a pitch angle on a left side of the chassis,
an average value of said pitch angles,
an angle of rotation of the chassis about a diagonal axis formed by a left front wheel and a right rear wheel of the chassis,
an angle of rotation of the car plant about a diagonal axis formed by a right front wheel and a left rear wheel of the chassis,
or an average value of the angle of rotation about the diagonal axes,
and wherein the processor sets an identification signal for the possible existence of a loss of load bearing capacity in the case in which the predefined critical threshold values are exceeded or not attained.

\* \* \* \* \*